US012728913B2

(12) United States Patent
Aosaki et al.

(10) Patent No.: US 12,728,913 B2
(45) Date of Patent: Sep. 8, 2026

(54) ROTATION ANGLE SENSOR, ELECTRIC POWER STEERING DEVICE, AND PRODUCTION METHOD FOR ROTATION ANGLE SENSOR

(71) Applicant: NSK LTD., Tokyo (JP)

(72) Inventors: Yoshihiro Aosaki, Fujisawa (JP); Hiroyuki Yamamura, Tokyo (JP); Yusuke Nishioka, Maebashi (JP)

(73) Assignee: NSK LTD., Tokyo (JP)

( * ) Notice: Subject to any disclaimer, the term of this patent is extended or adjusted under 35 U.S.C. 154(b) by 1308 days.

(21) Appl. No.: 17/596,408

(22) PCT Filed: Dec. 21, 2020

(86) PCT No.: PCT/JP2020/047701
§ 371 (c)(1),
(2) Date: Dec. 9, 2021

(87) PCT Pub. No.: WO2021/153097
PCT Pub. Date: Aug. 5, 2021

(65) Prior Publication Data

US 2026/0241985 A1 Aug. 20, 2026

(30) Foreign Application Priority Data

Jan. 31, 2020 (JP) ................................ 2020-015126

(51) Int. Cl.
*B62D 5/04* (2006.01)
*G01B 7/30* (2006.01)

(52) U.S. Cl.
CPC ......... *B62D 5/0481* (2013.01); *B62D 5/0406* (2013.01); *G01B 7/30* (2013.01)

(58) Field of Classification Search
CPC ...... B62D 5/0481; B62D 5/0406; G01B 7/30; G05B 2219/37124
See application file for complete search history.

(56) References Cited

U.S. PATENT DOCUMENTS

2011/0068780 A1 3/2011 Sakai
2014/0015384 A1 1/2014 Someya et al.
2014/0339966 A1 11/2014 Tomizawa et al.

FOREIGN PATENT DOCUMENTS

CN 201885728 U 6/2011
CN 207585795 U 7/2018
CN 116507023 A * 7/2023 ........... H05K 3/0011
(Continued)

OTHER PUBLICATIONS

International Search Report for PCT/JP2020/047701 dated Mar. 2, 2021 [PCT/ISA/210].
(Continued)

*Primary Examiner* — Christopher E Mahoney
(74) *Attorney, Agent, or Firm* — Sughrue Mion, PLLC

(57) ABSTRACT

A rotation angle sensor including: a magnet fixed to an end on an opposite side to an output end of a rotation shaft of a motor; a circuit board on which a plurality of magnetic resistance sensor elements are mounted; and a support member fixed to the motor, wherein the circuit board is arranged between the support member fixed to the motor and the motor and is fixed to the support member in such a way that the plurality of magnetic resistance sensor elements come close to the magnet.

8 Claims, 9 Drawing Sheets

(56) References Cited

FOREIGN PATENT DOCUMENTS

| | | | | |
|---|---|---|---|---|
| JP | H08-150945 | * | 11/1994 | |
| JP | 07-190803 | A | 7/1995 | |
| JP | 2010-238990 | A | 10/2010 | |
| JP | 2012-215415 | A | 11/2012 | |
| JP | 2014-225998 | A | 12/2014 | |
| JP | 2019-156291 | A | 9/2019 | |
| KR | 20050016122 | A * | 2/2005 | ............... G01B 7/30 |
| WO | 2015/093356 | A1 | 6/2015 | |
| WO | 2017/017806 | A1 | 2/2017 | |

OTHER PUBLICATIONS

Written Opinion for PCT/JP2020/047701 dated Mar. 2, 2021 [PCT/ISA/237].

International Preliminary Report on Patentability dated Aug. 13, 2021, issued in International Application No. PCT/JP2020/047701.

European Search Report issued Jun. 24, 2022 in European Application No. 20916243.7.

Office Action issued Jul. 6, 2022 in European Application No. 20916243.7.

* cited by examiner

ROTATION ANGLE SENSOR, ELECTRIC POWER STEERING DEVICE, AND PRODUCTION METHOD FOR ROTATION ANGLE SENSOR

CROSS REFERENCE TO RELATED APPLICATIONS

This application is a National Stage of International Application No. PCT/JP2020/047701 filed Dec. 21, 2020, claiming priority based on Japanese Patent Application No. 2020-015126 filed Jan. 31, 2020.

TECHNICAL FIELD

The present invention relates to a rotation angle sensor, an electric power steering device, and a production method for a rotation angle sensor.

BACKGROUND ART

Resolvers have been widely known as sensors that detect a rotation angle of a motor. In PTL 1, an electric power steering device configured to control steering assist force provided to a steering system of a vehicle, based on a rotation angle of a motor detected by a resolver is described.

In PTL 2, a production method for a piezoelectric sensor, the method heat-treating a composite body of a substrate portion in which a piezoelectric film is sandwiched between electrodes and a detection plate stuck on the substrate portion and thereby mitigating internal stress generated in the composite body, is described.

CITATION LIST

Patent Literature

PTL 1: JP 2019-156291 A
PTL 2: WO 2015/093356 A1

SUMMARY OF INVENTION

Technical Problem

It is conceivable that, in an electric actuator product including a motor as the above-described electric power steering device, a redundant configuration in which a plurality of sensors simultaneously detect a rotation angle of one motor is employed. Employing a redundant configuration enables reliability of an electric actuator product to be increased, such as the case of, even when an abnormality occurs in any one of a plurality of sensors, continuing motor control or diagnosing the abnormality of the sensor, using the other normal sensors.

However, mounting a plurality of expensive resolvers invites an increase in production cost of an electric actuator product.

The present invention has been made in consideration of the above-described problem, and an object of the present invention is to achieve a redundant configuration to simultaneously detect a rotation angle of one motor by a plurality of sensors at low cost.

Solution to Problem

In order to achieve the above-described object, according to an aspect of the present invention, there is provided a rotation angle sensor including: a magnet fixed to an end on an opposite side to an output end of a rotation shaft of a motor; a circuit board on which a plurality of magnetic resistance sensor elements, which detect magnetic flux, are mounted; and a support member fixed to the motor, wherein the circuit board is arranged between the support member fixed to the motor and the motor and is fixed to the support member in such a way that the plurality of magnetic resistance sensor elements come close to the magnet.

According to another aspect of the present invention, there is provided an electric power steering device including: the rotation angle sensor described above; and a motor, wherein the electric power steering device provides a steering system of a vehicle with a steering assist force, using the motor, based on a rotation angle of the motor, the rotation angle being detected by the rotation angle sensor.

According to still another aspect of the present invention, there is provided a production method for a rotation angle sensor including: mounting a plurality of magnetic resistance sensor elements on a circuit board; fixing a magnet to an end on an opposite side to an output end of a rotation shaft of a motor; fixing the circuit board to the support member; and by fixing the support member to the motor, arranging the circuit board between the support member and the motor in such a way that the plurality of magnetic resistance sensor elements come close to the magnet.

Advantageous Effects of Invention

According to the present invention, it is possible to achieve a redundant configuration to simultaneously detect a rotation angle of one motor by a plurality of sensors at low cost.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

Configuration

Figure 1:
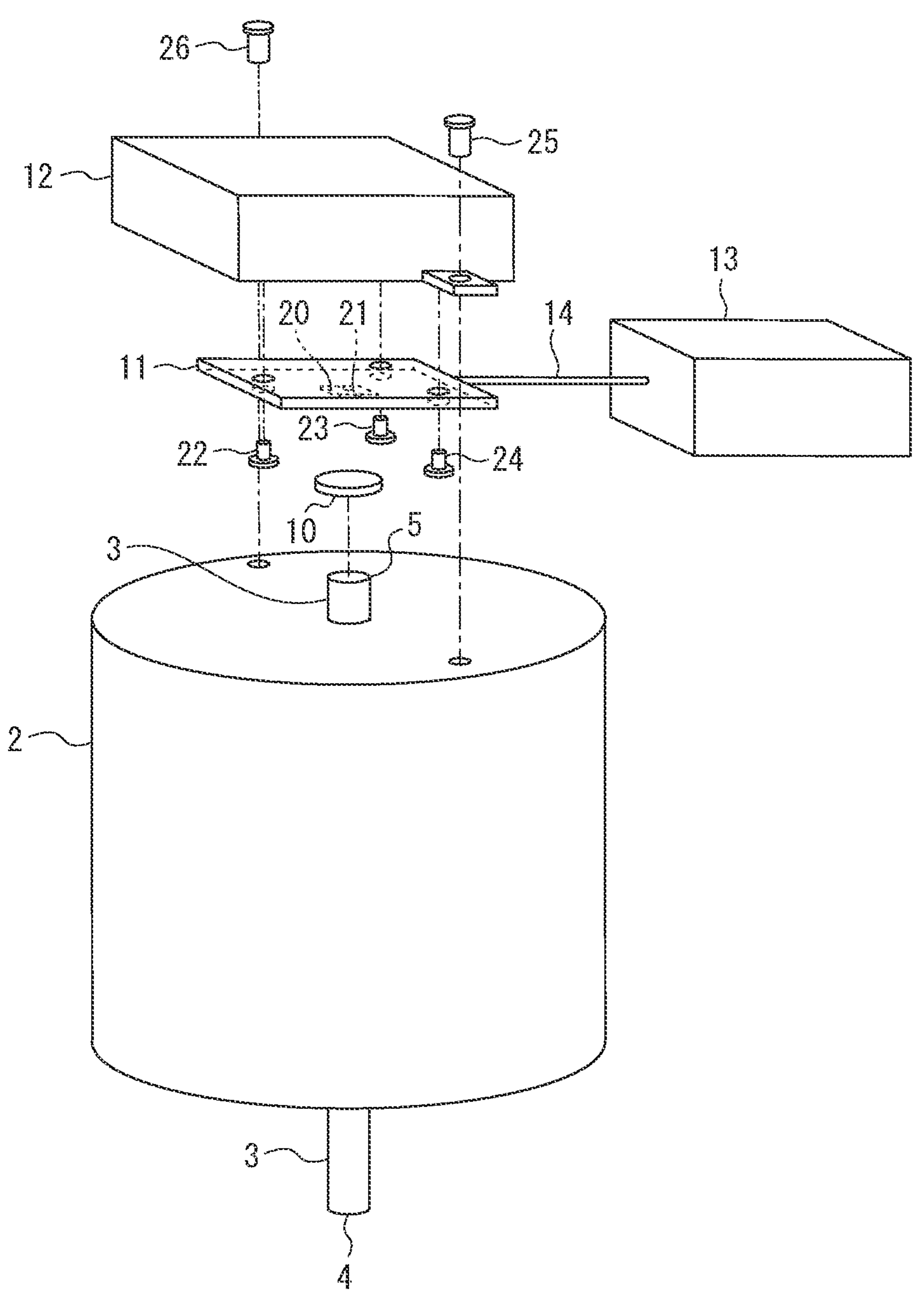
FIG. 1 is an exploded view illustrative of an outline of an example of a rotation angle sensor of an embodiment.

FIG. 1 is now referred to. A rotation angle sensor of the embodiment includes a sensor unit 1 that includes a plurality of magnetic resistance (MR) sensor elements, an electronic control unit (ECU) 13 that is a separate entity from the sensor unit 1, and a harness 14 that transmits signals between the sensor unit 1 and the electronic control unit 13, and detects a rotation angle of a motor 2.

The sensor unit 1 includes a magnet 10, a circuit board 11, and a support member 12.

The magnet 10 is fixed to an end 5 on the opposite side to an output end 4 of the rotation shaft 3 of the motor 2 and has different magnetic poles (S-poles and N-poles) arranged along the circumferential direction of the rotation shaft 3.

On the circuit board 11, a plurality of MR sensor elements that detect magnetic flux are mounted. In the example in FIG. 1, a first MR sensor element 20 and a second MR sensor element 21 are mounted on the circuit board 11 as the plurality of MR sensor elements.

The circuit board 11 is fixed to the support member 12 at three fixing points by three fixing means 22, 23, and 24. In the example in FIG. 1, the fixing means 22, 23, and 24 are screws that fasten the circuit board 11 to the support member 12.

The support member 12 is fixed to the motor 2 by fixing means 25 and 26. In the example in FIG. 1, the fixing means 25 and 26 are screws that fasten the support member 12 to the motor 2.

A position at which the circuit board 11 is fixed to the support member 12 by the three fixing means 22, 23, and 24 and a position at which the support member 12 is fixed to the motor 2 by the fixing means 25 and 26 are determined in such a way that, when the circuit board 11 is fixed to the support member 12 and the support member 12 is fixed to the motor 2, the circuit board 11 is arranged between the support member 12 and the motor 2 and the first MR sensor element 20 and the second MR sensor element 21 come close to the magnet 10.

The support member 12 is, for example, a cover that covers the circuit board 11. The support member 12, for example, has a recessed portion that opens downward in FIG. 1, and the circuit board 11 is fixed inside the recessed portion of the support member 12. When the support member 12 is fixed to the motor 2, an opening portion of the recessed portion of the support member 12 is shielded by the motor 2 and the circuit board 11 is housed inside an internal space that is defined by the recessed portion of the support member 12 and the motor 2. This configuration causes the circuit board 11 to be protected from impact or foreign objects from the outside.

The support member 12 may be formed of a metal having excellent thermal conductivity, such as an aluminum alloy, and may act as a heat sink. The support member 12 may be a heat sink itself.

Note that the number of MR sensor elements mounted on the circuit board 11 is not limited to two and three or more MR sensor elements may be mounted on the circuit board 11.

In addition, the numbers of fixing means and fixing points by and at which the circuit board 11 is fixed to the support member 12 are not limited to three, and the circuit board 11 may be fixed to the support member 12 by and at four or more fixing means and fixing points.

The number of fixing means by which the support member 12 is fixed to the motor 2 is not limited to two, and the support member 12 may be fixed to the motor 2 by three or more fixing means.

Positions at which the first MR sensor element 20 and the second MR sensor element 21 are mounted on the circuit board 11, that is, in-plane positions of the first MR sensor element 20 and the second MR sensor element 21 on the circuit board 11, are preferably arranged inside a polygon (triangle in the example in FIG. 1) with three or more fixing points (three fixing points in the example in FIG. 1) by three or more fixing means (fixing means 22, 23, and 24 in the example in FIG. 1) as vertices. Arranging the first MR sensor element 20 and the second MR sensor element 21 at such positions enables fluctuation in relative positions of the first MR sensor element 20 and the second MR sensor element 21 with respect to the magnet 10 when vibration or impact is exerted on the sensor unit 1 to be suppressed.

The ECU 13 calculates a rotation angle θm of the motor 2, based on detection signals detected by the first MR sensor element 20 and the second MR sensor element 21 and controls a power semiconductor switching element (not illustrated) according to the calculated rotation angle θm to drive the motor 2.

Figure 2:
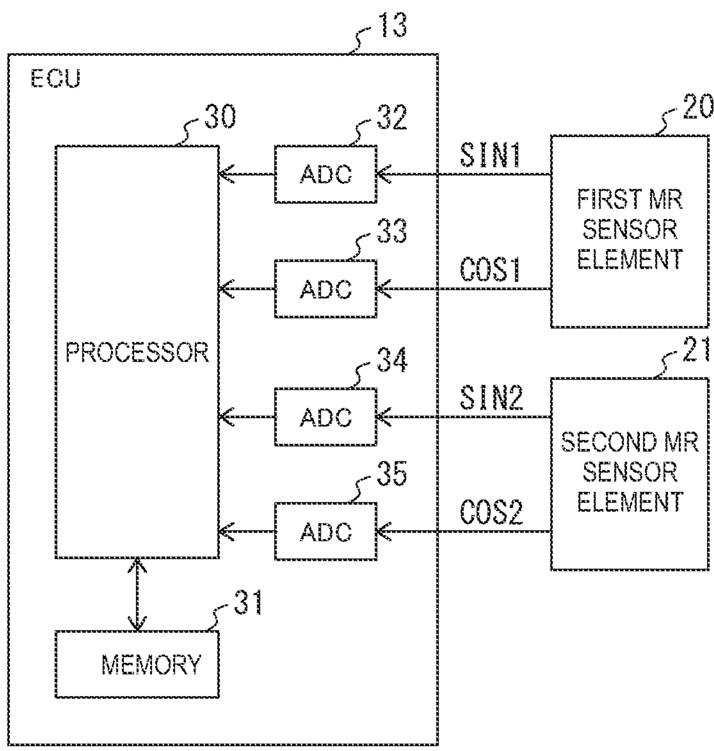
FIG. 2 is an explanatory diagram of a functional configuration of the rotation angle sensor of the embodiment.

FIG. 2 is now referred to. The ECU 13 includes a processor 30, such as a central processing unit (CPU) or a micro-processing unit (MPU), a memory 31, and analog-digital converters (ADCs) 32 to 35. The memory 31 and the ADCs 32 to 35 are sometimes incorporated into the processor 30, such as an MPU. Functions of the ECU 13 that will be described below are achieved by, for example, the processor 30 executing computer programs stored in the memory 31.

Detection of the rotation angle θm by the rotation angle sensor of the embodiment will be described below.

The first MR sensor element 20 detects magnetic flux of the magnet 10, which rotates integrally with the rotation shaft 3 of the motor 2, and thereby outputs a sine signal SIN1=sinθm and a cosine signal COS1=cosθm according to the rotation angle θm of the motor 2. The ECU 13 reads the sine signal SIN1 and the cosine signal COS1 that are converted to digital signals by the ADC 32 and the ADC 33, respectively. The ECU 13 calculates a rotation angle θm of the motor 2, based on the sine signal SIN1 and the cosine signal COS1.

The second MR sensor element 21 outputs a sine signal SIN2=sinθm and a cosine signal COS2=cosθm according to the rotation angle θm of the motor 2, separately from the first MR sensor element 20. The ECU 13 reads the sine signal SIN2 and the cosine signal COS2 that are converted to digital signals by the ADC 34 and the ADC 35, respectively. The ECU 13 calculates a rotation angle θm of the motor 2, based on the sine signal SIN2 and the cosine signal COS2.

As described above, the rotation angle sensor of the embodiment has a redundant configuration to simultaneously detect a rotation angle of one motor by a plurality of MR sensor elements.

Figure 3:
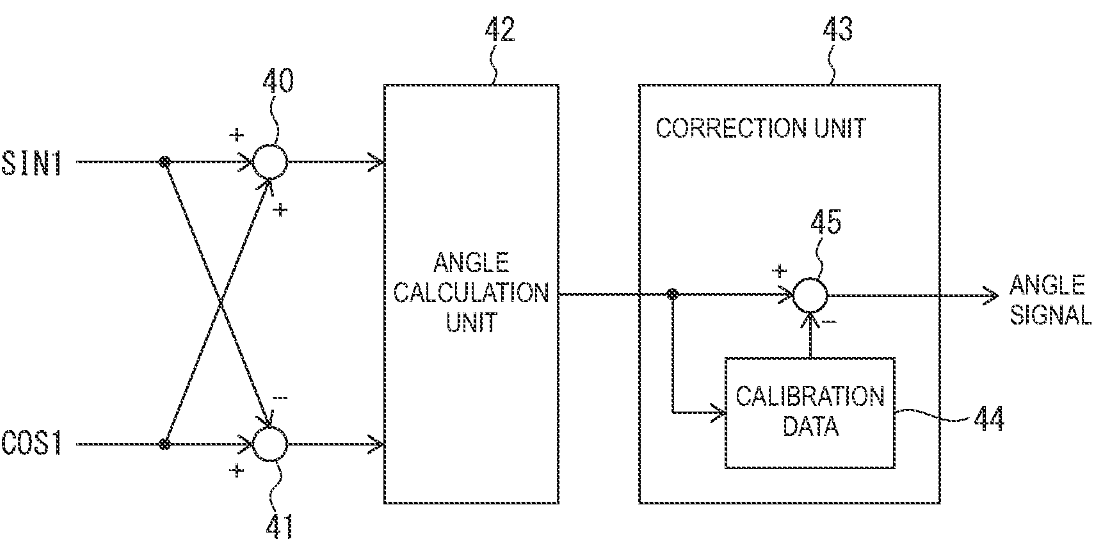
FIG. 3 is a functional block diagram of an angle calculation function performed by an electronic control unit of the embodiment.

With reference to FIG. 3, an example of a calculation function of a rotation angle θm performed by the ECU 13 will be described. Note that, although calculation of a rotation angle θm based on the sine signal SIN1 and the cosine signal COS1 of the first MR sensor element 20 will be described below, the same applies to calculation of a rotation angle θm based on the sine signal SIN2 and the cosine signal COS2 of the second MR sensor element 21.

The ECU 13 includes an adder 40, a subtractor 41, an angle calculation unit 42, and a correction unit 43.

The angle calculation unit 42 calculates a detected angle θd as a rotation angle θm of the motor 2, based on an output (COS1+SIN1) of the adder 40 and an output (COS1−SIN1) of the subtractor 41.

The correction unit 43, by subtracting calibration data 44 stored in the memory 31 of the ECU 13 from the detected angle θd, using a subtractor 45, corrects the detected angle θd and outputs an angle signal indicating the rotation angle θm of the motor 2.

The calibration data 44 are data for correcting error (so-called linearity error) between an actual rotation angle θm that is a detection target and a detected angle θd.

Figure 4:
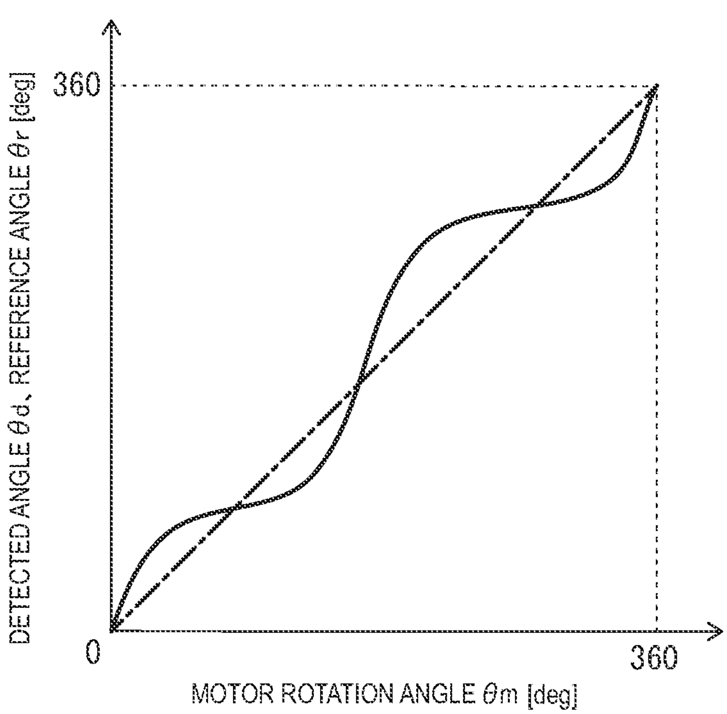
FIG. 4 is an explanatory diagram of an example of calibration data.

FIG. 4 is now referred to. The abscissa represents the actual rotation angle θm of the rotation shaft 3 of the motor 2, and the ordinate represents a reference angle θr (alternate long and short dash line) that is identical to the rotation angle θm, and the detected angle θd (solid line).

The calibration data 44 are, for example, data that are generated by storing a difference (θd−θr) between the detected angle θd and the reference angle θr in the memory 31 in association with the detected angle θd.

The calibration data 44 may be generated by, while reading the actual rotation angle θm of the rotation shaft 3 of the motor 2 as the reference angle θr by the calibrated rotation angle sensor, calculating the detected angle θd and storing difference (θd−θr) between the detected angle θd and the reference angle θr in association with the detected angle θd.

The correction unit 43 calculates a corrected rotation angle θr=θm by reading the calibration data 44 (θd−θr), which are stored in association with the detected angle θd, from the memory 31 and subtracting the calibration data 44 from the detected angle θd.

Because of the configuration as described above, it is possible to achieve a redundant configuration to simultaneously detect a rotation angle of one motor by a plurality of sensors, using comparatively low-cost MR sensor elements.

Note that the configuration described above is only an example and it is not intended that the present invention be limited to the above-described configuration.

For example, the sensor unit 1 and the ECU 13 may be integrally configured. For example, the processor 30, memory 31, and ADCs 32 to 35 of the ECU 13 may be mounted on the circuit board 11.

In addition, the support member 12 may be formed of a plurality of members.

Figure 5:
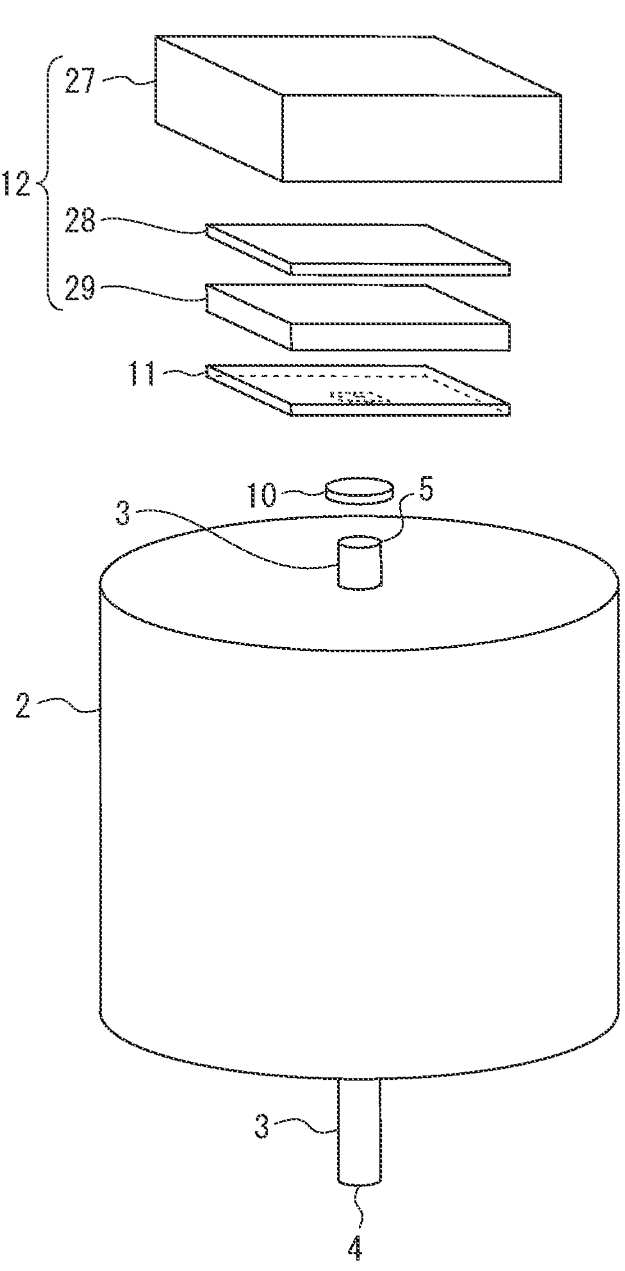
FIG. 5 is an exploded view illustrative of an outline of another example of the rotation angle sensor of the embodiment.

FIG. 5 is now referred to. The support member 12 may include a cover (or heat sink) 27 that is formed of a metal having high thermal conductivity, such as aluminum alloy, a power substrate 28 that is made of aluminum and on which a power semiconductor switching element is mounted, and a resin-made insert member 29 that is interposed between the circuit board 11 and the power substrate 28. The ECU 13 is integrated with the circuit board 11, and, inside the insert member 29, electric wire (such as a bus bar) electrically connecting the circuit board 11 and the power substrate 28 is arranged.

By fixing the circuit board 11 to the insert member 29, which is fixed to the cover 27 with the power substrate 28 interposed therebetween, at three or more fixing points by three or more fixing means (not illustrated) and fixing the cover or heat sink 27 to the motor 2, the circuit board 11 is arranged between the support member 12 and the motor 2 in such a way that the first MR sensor element 20 and the second MR sensor element 21 come close to the magnet 10.

The fixing means by which the circuit board 11 is fixed to the resin-made insert member 29 may be fastening members, such as screws. Alternatively, the circuit board 11 may be fixed to the insert member 29 by inserting a resin-made pin (projecting portion) of the insert member 29 into a through-hole formed in the circuit board 11 and swaging the pin.

The rotation angle sensor using the MR sensor elements as described above on one hand has advantages such as "being compact" and "being easily configured to have redundancy" and on the other hand has shortcomings such as being inferior to conventional resolvers in temperature characteristics and stress characteristics of detection signals.

Thus, there has been a problem in that, when, for example, heat is applied after shipment even when the rotation angle sensor is calibrated (that is, the calibration data 44 are generated) under room temperature atmosphere at the time of shipment, linearity of the rotation angle sensor does not return to linearity at the time of shipment even when temperature subsequently returns to room temperature.

Figure 6:
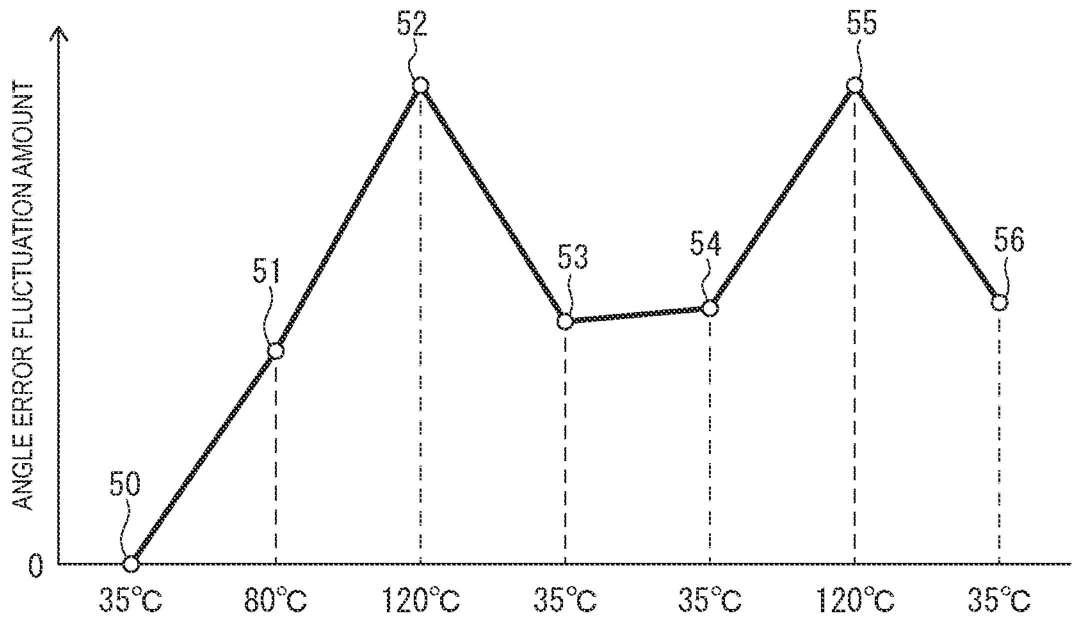
FIG. 6 is an explanatory diagram of an example of angle error of the rotation angle sensor in a temperature cycle test.

FIG. 6 illustrates angle error of a rotation angle sensor in a temperature cycle test. A plot 50 indicates that angle error of the rotation angle sensor immediately after calibration at 35° C. is 0, and plots 51 and 52 indicate angle error when temperature is 80° C. and 120° C., respectively, in the first temperature cycle.

Plots 53 and 54 indicate angle error when the temperature returns to 35° C. after the first temperature cycle, and a plot 55 indicates angle error when the temperature is 120° C. in the second temperature cycle. A plot 56 indicates angle error when the temperature returns to 35° C. after the second temperature cycle.

As the plots 51, 52, and 55 indicate, although the angle error increases when heat is applied to the rotation angle sensor, the angle error at the temperature of 35° C. (plots 53, 54, and 56) does not return to the angle error before heat is applied (plot 50) even when the temperature subsequently returns to the original temperature.

On the other hand, it is revealed that the angle error when the temperature returns to 35° C. after the second temperature cycle (plot 56) is approximately the same as the angle error when the temperature returns to 35° C. after the first temperature cycle (plots 53 and 54). That is, it is revealed that the angle error at room temperature after heat has been applied once returns to error of the same magnitude even when heat is subsequently applied again.

It is considered that the reason for the above phenomenon is that an MR element has large output fluctuation with respect to stress change and, when heat is applied, structures (the circuit board 11 and the support member 12) supporting the MR sensor elements are plastically deformed and stress applied to the MR sensor elements has changed from stress at the time of calibration.

Thus, in the rotation angle sensor of the present embodiment, the circuit board 11 and the support member 12 are plastically deformed in advance by heat treatment. Through this processing, it is possible to return the angle error when the temperature returns to room temperature to the angle error at the time of shipment even when heat is applied to the rotation angle sensor after shipment.

Stress generated when the circuit board 11 is fixed to the support member 12 by the fixing means 22, 23, and 24 also influences stress applied to the first MR sensor element 20 and the second MR sensor element 21.

As a result, when the fixed state of the circuit board 11 and the support member 12 changes due to plastic deformation by heating, the angle error is caused to change. Therefore, heat treatment that plastically deforms the circuit board 11 and the support member 12 is preferably performed with the circuit board 11 fixed to the support member 12 by the fixing means 22, 23, and 24.

This method enables change in the angle error because of change in the fixed state of the circuit board 11 and the support member 12 due to plastic deformation by heating to be reduced.

In addition, it is preferable to calibrate the detected angle θd that is calculated from the sine signal SIN1 and the cosine signal COS1 output from the first MR sensor element 20, under room temperature atmosphere after the circuit board 11 and the support member 12 have been plastically deformed by heat treatment and store the obtained calibration data 44 in the memory 31. The same applies to the sine signal SIN2 and cosine signal COS2 of the second MR sensor element 21.

In the heat treatment that plastically deforms the circuit board 11 and the support member 12, it is preferable to heat the circuit board 11 and the support member 12 at a temperature equal to or greater than an ambient temperature around the rotation angle sensor in an actual usage environment.

For example, in the case of a rotation angle sensor that detects a rotation angle of a motor in an electric power steering device, ambient temperature around an MR sensor element sometimes reaches approximately 100° C. under the influence of heat generation by the motor or the like. Thus, in the heat treatment that plastically deforms the circuit board 11 and the support member 12, the heat treatment is preferably performed at a temperature equal to or greater than 100° C.

Performing calibration after heat treatment as described above enables detection precision of the rotation angle sensor under room temperature atmosphere to be improved.

Figure 7:
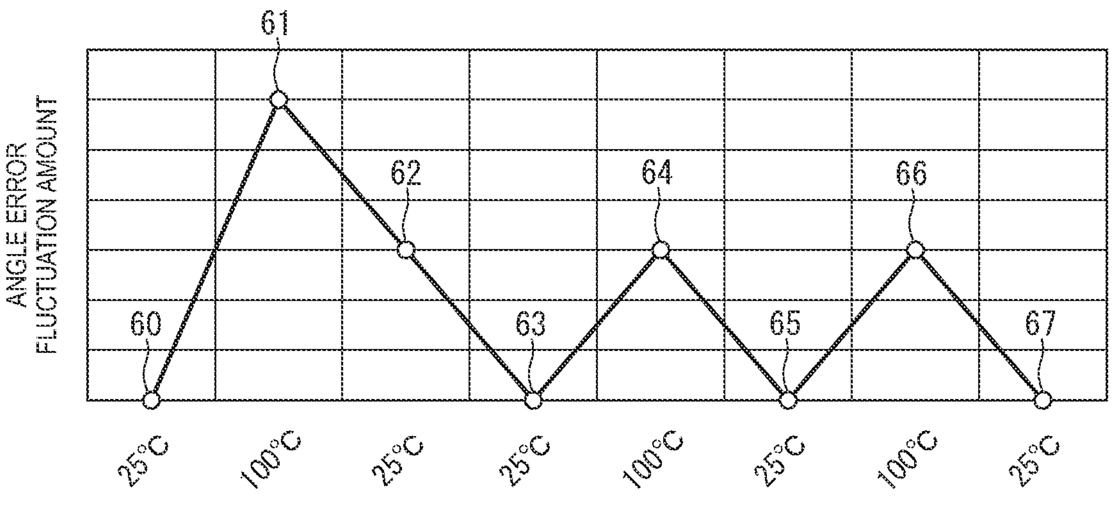
FIG. 7 is an explanatory diagram of angle error when calibration is performed after heat treatment.

FIG. 7 is now referred to. A plot 60 indicates that angle error of the rotation angle sensor immediately after calibration at 25° C. is 0. A plot 61 indicates angle error when the temperature is 100° C. in the first temperature cycle. A plot 62 indicates angle error when the temperature returns to 25° C. after the first temperature cycle. As described above, the angle error at room temperature after heat has been applied once (plot 62) does not return to the angle error before heat is applied (plot 60).

Accordingly, as indicated by a plot 63, the calibration is performed again and the angle error of the rotation angle sensor is thereby reduced to 0 at 25° C.

Subsequent plots 64 and 66 indicate angle error when the temperature is 100° C. in the second and third temperature cycles, respectively, and plots 65 and 67 indicate angle error when the temperature returns to 25° C. after the second and third temperature cycles, respectively.

By performing calibration when the temperature returns to 25° C. after the first temperature cycle, it is possible to return the angle error when the temperature returns to 25° C. after the second and third temperature cycles (plots 65 and 67) to approximately the same angle error as the angle error after calibration (plot 60).

(Production Method for Rotation Angle Sensor)

Figure 8:
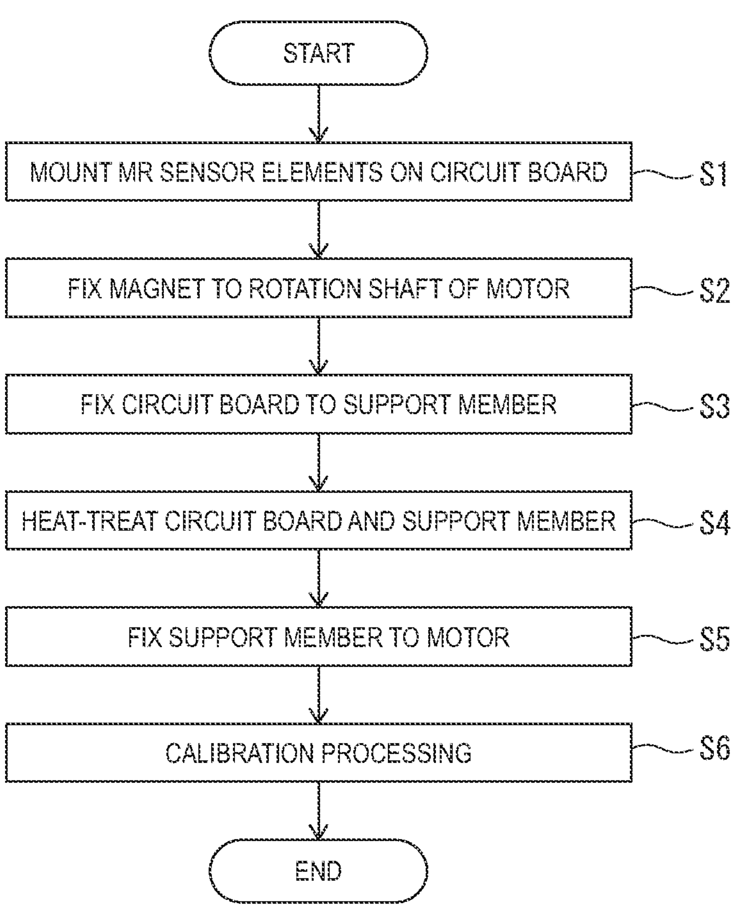
FIG. 8 is a flowchart of an example of a production method for the rotation angle sensor of the embodiment.

Next, with reference to FIG. 8, a production method for the rotation angle sensor of the embodiment will be described.

In step S1, the first MR sensor element 20 and the second MR sensor element 21 are mounted on the circuit board 11.

In step S2, the magnet 10 is fixed to the end 5 on the opposite side to the output end 4 of the rotation shaft 3 of the motor 2.

In step S3, the circuit board 11 is fixed to the support member 12 at three or more fixing points by three or more fixing means.

In step S4, by heat-treating the support member 12 to which the circuit board 11 is fixed, the circuit board 11 and the support member 12 are plastically deformed.

Note that step S2 may be executed before step S1 and step S2 may be executed after step S4.

In step S5, the support member 12 is fixed to the motor 2.

In step S6, a detected angle θd that is calculated from a sine signal SIN1 and a cosine signal COS1 output from the first MR sensor element 20 under room temperature atmosphere is calibrated, and obtained calibration data 44 are stored in the memory 31. The same applies to a sine signal SIN2 and cosine signal COS2 of the second MR sensor element 21. Subsequently, the process is terminated.

(Application of Rotation Angle Sensor)

Figure 9:
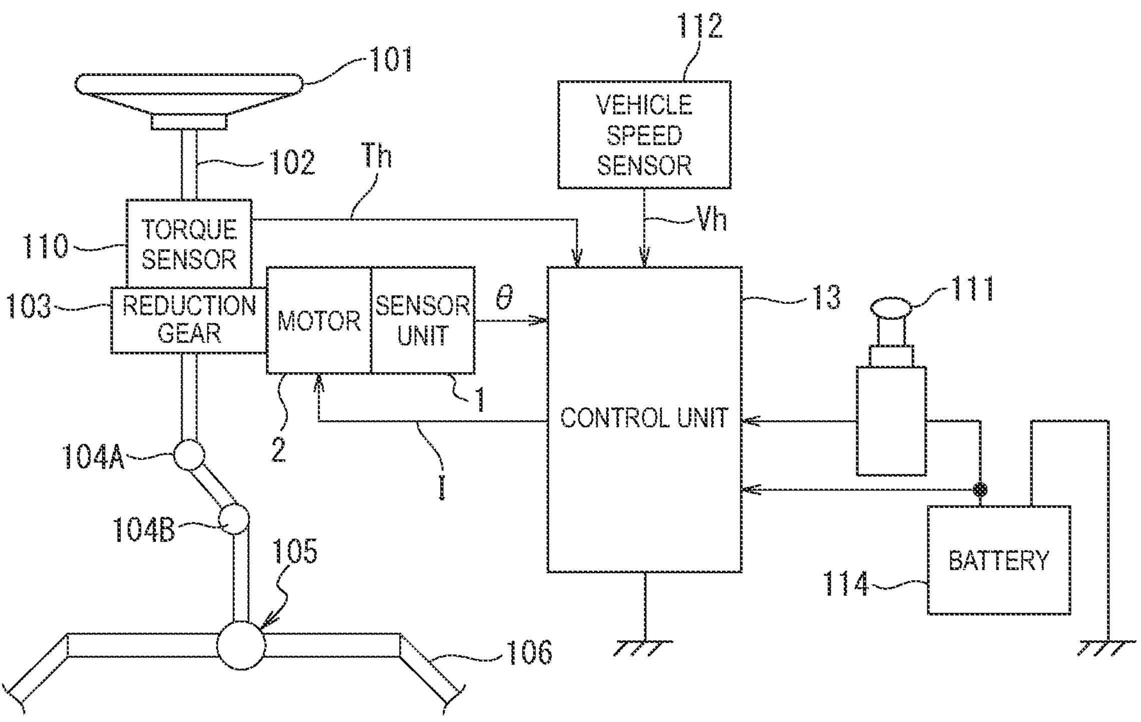
FIG. 9 is a configuration diagram illustrative of an outline of an example of an electric power steering device that includes the rotation angle sensor of the embodiment.

Next, with reference to FIG. 9, a configuration example in a case where the rotation angle sensor of the present embodiment is applied to an electric power steering device that controls steering assist force provided to the steering system of a vehicle will be described.

A column shaft 102 of a steering wheel 101 is connected to tie rods 106 of steered wheels via a reduction gear 103, universal joints 104A and 104B, and a pinion rack mechanism 105. To the column shaft 102, a torque sensor 110 that detects steering torque Th of the steering wheel 101 is disposed, and the motor 2 that assists steering force of the steering wheel 101 is connected to the column shaft 102 via the reduction gear 103.

The above-described ECU 13 is used as an electronic control unit that controls the power steering device. To the ECU 13, power is supplied from a battery 114 that is a power source, and an ignition key signal is also input from an ignition key 111.

The ECU 13 calculates a steering angle θ of the steering wheel 101, based on the rotation angle θm of the motor 2 that is calculated as described above and a reduction ratio N of the reduction gear 103. The ECU 13 performs calculation of a steering assist command value of an assist command, using an assist map or the like, based on the steering angle θ, the steering torque Th, and vehicle speed Vh that is detected by a vehicle speed sensor 112, and controls current I that is supplied to the motor 2, based on the calculated steering assist command value.

In the electric power steering device having such a configuration, the steering torque Th that is generated by steering operation by the driver and transmitted from the steering wheel 101 is detected by the torque sensor 110, a steering angle θ is calculated based on the rotation angle θm of the motor 2, the motor 2 is drive-controlled by a steering assist command value calculated based on the steering torque Th, the steering angle θ, and the vehicle speed Vh, and this drive is provided to the steering system as an assist force (steering assist force) for the steering operation by the driver.

Advantageous Effects of Embodiment (1) The rotation angle sensor of the embodiment includes the magnet 10 fixed to the end 5 on the opposite side to the output end 4 of the rotation shaft 3 of the motor 2, the circuit board 11 on which a plurality of MR sensor elements are mounted, and the support member 12 fixed to the motor 2. The circuit board 11 is fixed to the support member 12 in such a way that the plurality of MR sensor elements come close to the magnet 10 and arranged between the support member 12, which is fixed to the motor 2, and the motor 2.

Because of this configuration, it is possible to achieve a redundant configuration to simultaneously detect a rotation angle of one motor by a plurality of sensors, using comparatively low-cost MR sensor elements. This capability enables a redundant configuration to simultaneously detect a rotation angle of one motor by a plurality of sensors to be achieved at low cost.

(2) The circuit board 11 may be fixed to the support member 12 at three or more fixing points, and the in-plane positions of the MR sensor elements on the circuit board 11 may be arranged inside a polygon with the three or more fixing points as vertices.

This configuration enables fluctuation in relative positions of the MR sensor elements with respect to the magnet 10 when vibration or impact is exerted on the rotation angle sensor to be suppressed.

(3) The circuit board 11 and the support member 12 may be plastically deformed in advance by heat treatment. Through this processing, it is possible to return angle error when the temperature returns to room temperature to angle error at the time of shipment even when heat is applied to the rotation angle sensor after shipment.

(4) The circuit board 11 and the support member 12 may be plastically deformed by heat treatment with the circuit board 11 fixed to the support member 12. This method enables change in the angle error because of change in the fixed state of the circuit board 11 and the support member 12 due to plastic deformation by heating to be reduced.

(5) The rotation angle sensor of the embodiment may further include the memory 31 for storing the calibration data 44 for calibrating output signals from the MR sensor elements. The calibration data 44 that are generated by calibrating the magnetic resistance sensor elements under room temperature atmosphere after plastically deforming the circuit board 11 and the support member 12 by heat treatment may be stored in the memory 31.

Performing calibration after heat treatment as described above enables detection precision of the rotation angle sensor under room temperature atmosphere to be improved.

REFERENCE SIGNS LIST

1 Sensor unit
2 Motor
3 Rotation shaft
4 Output end
5 End
10 Magnet
11 Circuit board
12 Support member
13 Electronic Control Unit (ECU)
14 Harness
20, 21 Magnetic resistance (MR) sensor element
22, 23, 24, 25, 26 Fixing means
27 Cover (or heat sink)
28 Power substrate
29 Insert member
30 Processor
31 Memory
32, 33, 34, 35 Analog-digital converter (ADC)
40 Adder
41, 45 Subtractor
42 Angle calculation unit
43 Correction unit
44 Calibration data
101 Steering wheel
102 Column shaft
103 Reduction gear
104A, 104B Universal joint
105 Pinion rack mechanism
106 Tie rod
110 Torque sensor
111 Ignition key
112 Vehicle speed sensor
114 Battery

The invention claimed is:

1. A rotation angle sensor comprising:
a magnet fixed to an end on an opposite side to an output end of a rotation shaft of a motor;
a circuit board on which a plurality of magnetic resistance sensor elements are mounted; and
a support member fixed to the motor,
wherein the circuit board is arranged between the support member fixed to the motor and the motor and is fixed to the support member in such a way that the plurality of magnetic resistance sensor elements come close to the magnet, and
the circuit board and the support member are plastically deformed by heat treatment.

2. The rotation angle sensor according to claim 1, wherein the circuit board is fixed to the support member at three or more fixing points, and
in-plane positions of the magnetic resistance sensor elements on the circuit board are arranged inside a polygon with the three or more fixing points as vertices.

3. The rotation angle sensor according to claim 2, wherein the circuit board and the support member are plastically deformed by being heat-treated with the circuit board fixed to the support member.

4. The rotation angle sensor according to claim 1 further comprising
a memory for storing calibration data for calibrating output signals from the magnetic resistance sensor elements,
wherein calibration data generated by calibrating the magnetic resistance sensor elements after the circuit board and the support member have been plastically deformed by heat treatment are stored in the memory.

5. An electric power steering device comprising:
the rotation angle sensor according to claim 1; and
a motor,
wherein the electric power steering device provides a steering system of a vehicle with a steering assist force, using the motor, based on a rotation angle of the motor, the rotation angle being detected by the rotation angle sensor.

6. A production method for a rotation angle sensor comprising:
mounting a plurality of magnetic resistance sensor elements on a circuit board;
fixing a magnet to an end on an opposite side to an output end of a rotation shaft of a motor;
fixing the circuit board to a support member;
plastically deforming the circuit board and the support member by heat treatment; and
by fixing the support member to the motor, arranging the circuit board between the support member and the motor in such a way that the plurality of magnetic resistance sensor elements come close to the magnet.

7. The production method for the rotation angle sensor according to claim 6, including plastically deforming the circuit board and the support member by heat treatment after fixing the circuit board to the support member.

8. The production method for the rotation angle sensor according to claim 7, including calibrating the magnetic resistance sensor elements after plastically deforming the circuit board and the support member by heat treatment.

* * * * *